(12) United States Patent
Mao et al.

(10) Patent No.: US 8,294,077 B2
(45) Date of Patent: Oct. 23, 2012

(54) IMAGE SENSOR HAVING SUPPLEMENTAL CAPACITIVE COUPLING NODE

(75) Inventors: Duli Mao, Sunnyvale, CA (US); Hsin-Chih Tai, San Jose, CA (US); Vincent Venezia, Los Gatos, CA (US); Howard E. Rhodes, San Martin, CA (US); Sohei Manabe, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 200 days.

(21) Appl. No.: 12/972,188

(22) Filed: Dec. 17, 2010

(65) Prior Publication Data

US 2012/0153123 A1 Jun. 21, 2012

(51) Int. Cl.
*H01L 27/146* (2006.01)
(52) U.S. Cl. ..................................... 250/208.1
(58) Field of Classification Search ............... 250/208.1, 250/214.1, 214 R, 214 AG; 348/300–310; 257/290–294; 438/109–110
See application file for complete search history.

(56) References Cited

U.S. PATENT DOCUMENTS

| | | | |
|---|---|---|---|
| 6,657,665 B1 * | 12/2003 | Guidash | 348/308 |
| 7,075,049 B2 | 7/2006 | Rhodes et al. | |
| 7,115,925 B2 * | 10/2006 | Rhodes | 257/292 |
| 7,524,695 B2 * | 4/2009 | Rhodes | 438/60 |
| 7,728,896 B2 | 6/2010 | McKee | |
| 7,973,695 B2 * | 7/2011 | Kudo | 341/169 |
| 8,217,328 B2 * | 7/2012 | Yin et al. | 250/208.1 |
| 2006/0103749 A1 | 5/2006 | He | |
| 2009/0272879 A1 | 11/2009 | Dai | |

OTHER PUBLICATIONS

Preview brochure for Feb. 23, 2011 Conference on Image Sensors, Session 23, pp. 60-61, prior to application filing date.

* cited by examiner

*Primary Examiner* — Seung C Sohn
(74) *Attorney, Agent, or Firm* — Blakely Sokoloff Taylor & Zafman LLP (57) ABSTRACT

An image sensor includes a pixel array, a bit line, supplemental capacitance node line, and a supplemental capacitance circuit. The pixel array includes a plurality of pixel cells each including a floating diffusion ("FD") node and a photosensitive element coupled to selectively transfer image charge to the FD node. The bit line is coupled to selectively conduct image data output from a first group of the pixel cells. The supplemental capacitance node line is coupled to the FD node of a second group of the pixel cells to selectively couple a supplemental capacitance to the FD nodes of the second group in response to a control signal. In various embodiments, the first and second group of pixel cells may be the same group or a different group of the pixel cells and may add a capacitive boost feature or a multi conversion gain feature.

24 Claims, 11 Drawing Sheets

IMAGE SENSOR HAVING SUPPLEMENTAL CAPACITIVE COUPLING NODE

TECHNICAL FIELD

This disclosure relates generally to image sensors, and in particular, but not exclusively to complementary metal-oxide semiconductor ("CMOS") image sensors.

BACKGROUND INFORMATION

Image sensors have become ubiquitous. They are widely used in digital still cameras, cellular phones, security cameras, as well as, medical, automobile, and other applications. The technology used to manufacture image sensors, and in particular, complementary metal-oxide-semiconductor ("CMOS") image sensors ("CIS"), has continued to advance at great pace. For example, the demands of higher resolution and lower power consumption have encouraged the further miniaturization and integration of these image sensors.

Figure 1:
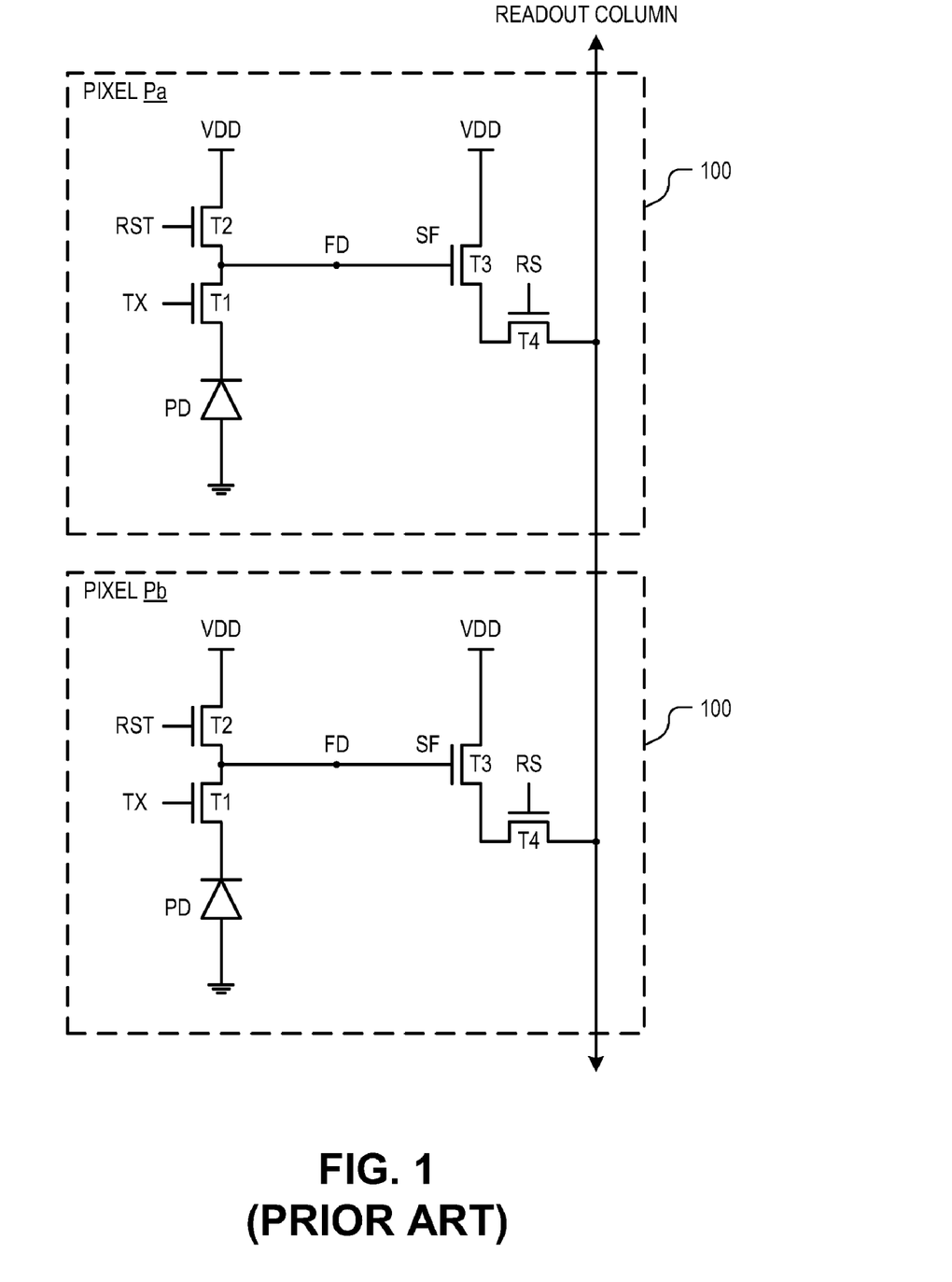
FIG. 1 (PRIOR ART) is a circuit diagram illustrating two conventional pixel cells within an image sensor array.

FIG. 1 is a circuit diagram illustrating pixel circuitry of two four-transistor ("4T") pixel cells Pa and Pb (collectively pixel cells 100) within an image sensor array. Pixel cells Pa and Pb are arranged in two rows and one column and time share a single readout column line. Each pixel cell 100 includes a photodiode PD, a transfer transistor T1, a reset transistor T2, a source-follower ("SF") or amplifier ("AMP") transistor T3, and a row select ("RS") transistor T4.

During operation, transfer transistor T1 receives a transfer signal TX, which transfers the charge accumulated in photodiode PD to a floating diffusion (FD) node. Reset transistor T2 is coupled between a power rail VDD and the FD node to reset the pixel (e.g., discharge or charge the FD and the PD to a preset voltage) under control of a reset signal RST. The FD node is coupled to control the gate of AMP transistor T3. AMP transistor T3 is coupled between the power rail VDD and RS transistor T4. AMP transistor T3 operates as a source-follower providing a high impedance connection to the FD node. Finally, RS transistor T4 selectively couples the output of the pixel circuitry to the readout column line under control of a signal RS.

In normal operation, the photodiode PD and the FD node are reset by temporarily asserting the reset signal RST and the transfer signal TX. The image accumulation window (exposure period) is commenced by de-asserting the transfer signal TX and permitting incident light to charge the photodiode PD. As photo-generated electrons accumulate on the photodiode PD, its voltage decreases (electrons are negative charge carriers). The voltage or charge on photodiode PD is indicative of the intensity of the light incident on the photodiode PD during the exposure period. At the end of the exposure period, the reset signal RST is de-asserted to isolate the FD node and the transfer signal TX is asserted to couple the photodiode to the FD node and hence the gate of AMP transistor T3. The charge transfer causes the voltage of the FD node to drop by an amount of proportional to photogenerated electrons accumulated on the photodiode PD during the exposure period. This second voltage biases AMP transistor T3, which is coupled to the readout column line when the signal RS is asserted on RS transistor T4.

The conversion gain of pixel cells 100 is defined as the ratio (R) of the change in voltage at the FD node after charge transfer to the change in charge transferred to the FD node. Conversion gain (R) is inversely proportional to the capacitance of the FD node. A high conversion gain R can be beneficial to improve low-light sensitivity. For traditional image sensors, conversion gain can be increased by reducing the capacitance of the FD node. However, as pixel cell sizes continue to shrink, pixel saturation or overexposure in bright environments is becoming more acute.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 7 is a timing diagram of control signals during operating of a pixel cell without an FD boost circuit and illustrates the effects of capacitive coupling due to a reset gate turning off and a transfer gate turning on.

DETAILED DESCRIPTION

Embodiments of a CMOS image sensor including a supplemental capacitive coupling node are described herein. In the following description, numerous specific details are described to provide a thorough understanding of embodiments of the invention. One skilled in the relevant art will recognize, however, that the invention can be practice without one or more of the specific details, or with other methods, components, materials, etc. In other instances, well-known structures, materials or operations are not shown or described in details but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Directional terminology such as "top", "bottom", "under" is used with reference to the orientation of the figure(s) being described.

Figure 2:
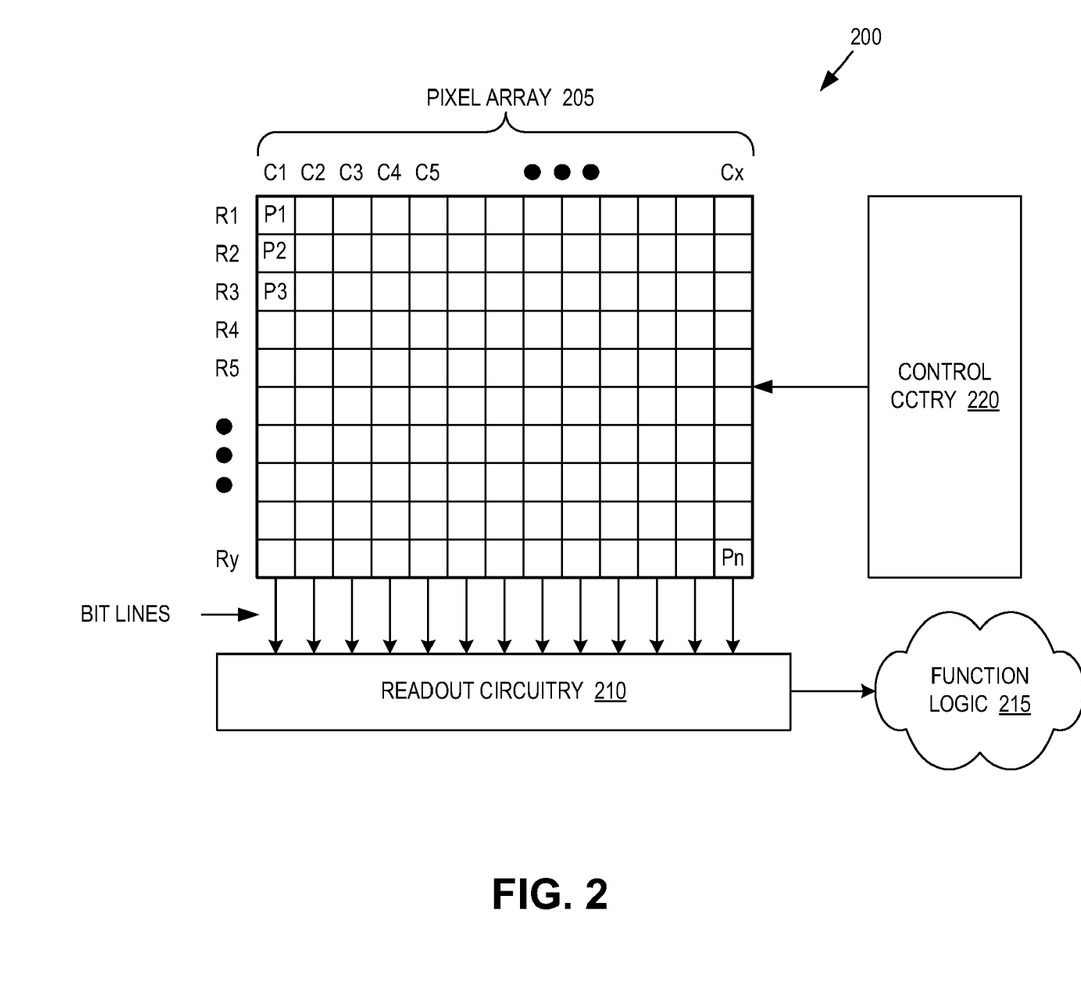
FIG. 2 is a block diagram illustrating an imaging system, in accordance with an embodiment of the invention.

FIG. 2 is a block diagram illustrating an imaging system 200, in accordance with an embodiment of the invention. The illustrated embodiment of imaging system 200 includes a pixel array 205, readout circuitry 210, function logic 215, and control circuitry 220.

Pixel array 205 is a two-dimensional ("2D") array of imaging sensor cells or pixel cells (e.g., pixels P1, P2 . . . , Pn). In one embodiment, each pixel is a complementary metal-oxide-semiconductor ("CMOS") imaging pixel. Pixel array 205 may be implemented as a frontside illuminated image sensor or a backside illuminated image sensor. As illustrated, each pixel is arranged into a row (e.g., rows R1 to Ry) and a column (e.g., column C1 to Cx) to acquire image data of a person, place, or object, which can then be used to render an image of the person, place, or object.

After each pixel has acquired its image data or image charge, the image data is readout by readout circuitry 210 and transferred to function logic 215. Readout circuitry 210 may include amplification circuitry, analog-to-digital ("ADC") conversion circuitry, or otherwise. Function logic 215 may simply store the image data or even manipulate the image data by applying post image effects (e.g., crop, rotate, remove red eye, adjust brightness, adjust contrast, or otherwise). In one embodiment, readout circuitry 210 may readout a row of image data at a time along readout column lines (illustrated as generic bit lines) or may readout the image data using a variety of other techniques (not illustrated), such as a serial readout, column readout along readout row lines, or a full parallel readout of all pixels simultaneously.

Control circuitry 220 is coupled to pixel array 205 and includes logic for controlling operational characteristic of pixel array 205. For example, reset, row select, and transfer signals may be generated by control circuitry 220, as discussed below. Additionally, dual conversion gain signals or FD boost signals, as discussed below, may also be generated by control circuitry 220. In one embodiment, control circuitry 220 may include photosensitive circuitry to measure the intensity of light impinging upon pixel array 205 and adjust the control signals accordingly.

A typical 4T pixel architecture includes various terminals (e.g., transfer gate, reset gate, reset drain, source follower drain, row select drain, row select gate, and bit line output) that are variously connected along conductive lines to either control circuitry 220 or readout circuitry 210. Some of these terminals are connected by conductive lines running row-wise (e.g., transfer gate, reset gate, row select), some are connected by conductive lines running column-wise (e.g., bit line output), while still others can be connected by conductive lines running in either row or column directions or even in a grid pattern (e.g., reset drain, source follower drain, row select devices). Thus, there are a number of conductive lines running in various directions or patterns. As discussed below, these conductive lines as well as additional lines routed along similar paths may be used to couple supplemental capacitance(s) into the pixel circuitry of each pixel within pixel array 205 to provide a multi conversion gain and/or a FD boost capacitance feature.

High conversion gain can be advantageous for CMOS image sensors operating under low light condition, because the gain is applied at the earliest stage of the signal chain, which produces low read noise. However, a higher conversion gain is typically accompanied by a lower full well capacity for a fixed analog-to-digital conversion range. This leads to lower signal to noise ratio in high light conditions when photon shot noise is the dominant noise source. Dual conversion gain CMOS image sensors have the advantage of high full well capacity (hence higher signal noise ratio) in high light environments and lower read noise is low light environments. In one embodiment, control circuitry determines a brightness value for the light impingent upon pixel array 205, and if high light conditions are determined to be present, then the conversion gain of pixel array 205 is reduced by decoupling a supplemental capacitance via appropriate assertion of the control signals. If low light conditions are determined to be present, then the conversion gain of pixel array 205 is increased by coupling the supplemental capacitance via appropriate assertion of the control signals.

Figure 3:
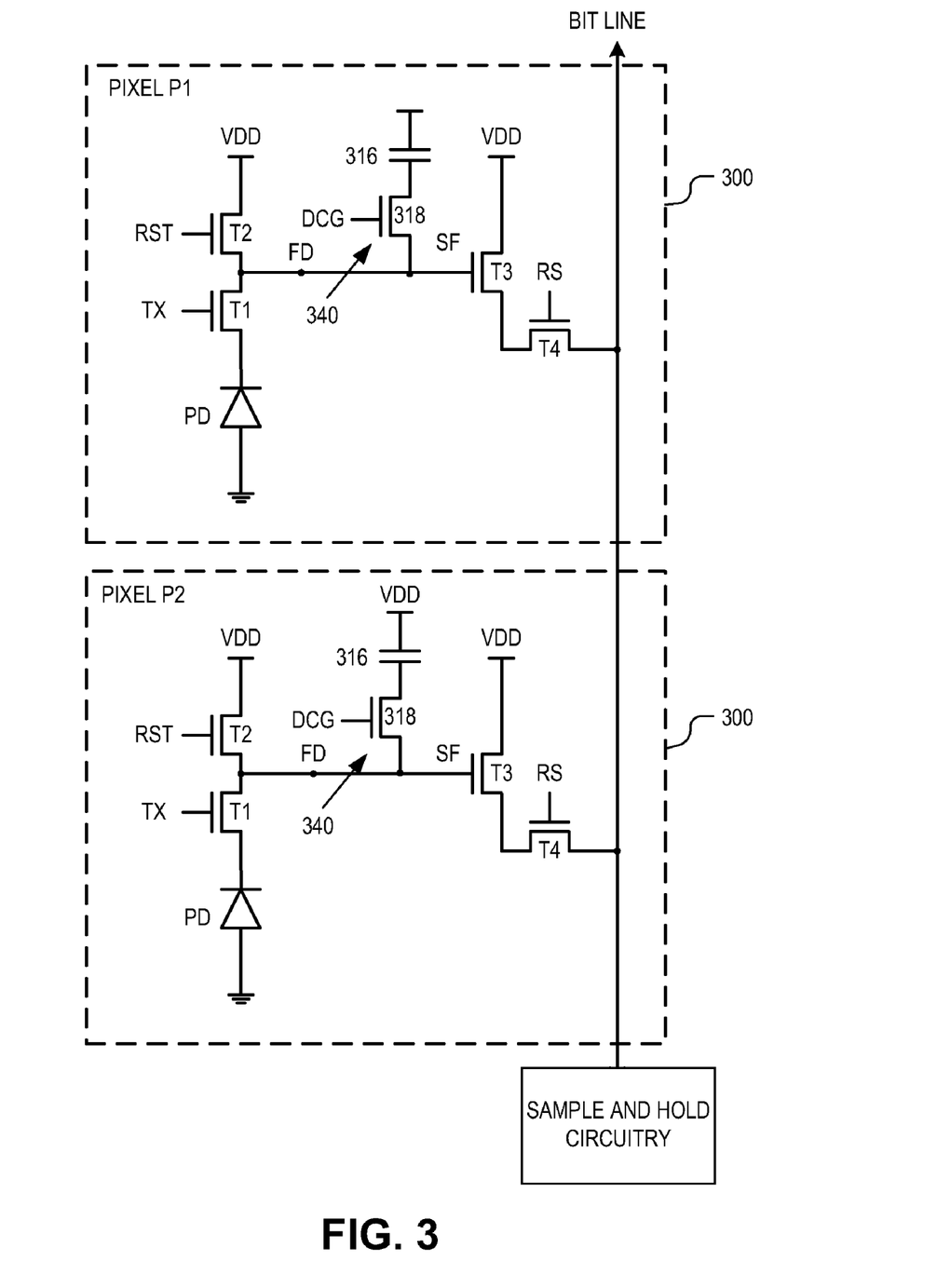
FIG. 3 is a circuit diagram illustrating two pixel cells with dual conversion gain within an image sensor array.

FIG. 3 is a circuit diagram illustrating pixel circuitry 300 of two four-transistor ("4T") pixels within a pixel array that include a dual conversion gain feature. Pixel circuitry 300 is one possible pixel circuitry architecture for implementing each pixel within pixel array 205 of FIG. 2. However, it should be appreciated that the teachings disclosed herein are not limited to 4T pixel architectures; rather, one of ordinary skill in the art having the benefit of the instant disclosure will understand that the present teachings are also applicable to various other pixel architectures.

In FIG. 3, pixel cells P1 and P2 are arranged in two rows and one column. Pixel cells P1 and P2 operate similar to pixels Pa and Pb of FIG. 1, but each includes a dual conversion gain ("DCG") circuit 340 coupled to the FD node. The illustrated embodiment of DCG circuit 340 includes a supplemental capacitor 316 and a control transistor 318 coupled in series between the FD node and a voltage rail (e.g., VDD, GND, or otherwise). By switching control transistor 118 on or off under control of the signal DCG, the capacitance of node FD can be selectively supplemented (e.g., increased over the inherent capacitance of the FD node) thereby changing the conversion gain of pixels cells P1 and P2.

The dual conversion gain solution of FIG. 3 is thus achieved by adding a supplemental capacitor 316 and a controlling transistor 318 within each pixel cell of pixel array 205. Controlling transistor 318 can be turned on or off globally based on auto-exposure control to connect or disconnect supplemental capacitor 316 to node FD, thereby realizing dual conversion gain. However, both the capacitor and controlling transistor takes silicon space and reduces fill factor of the photodiode PD. This can be a problem for small pixel size imagers.

Figure 4:
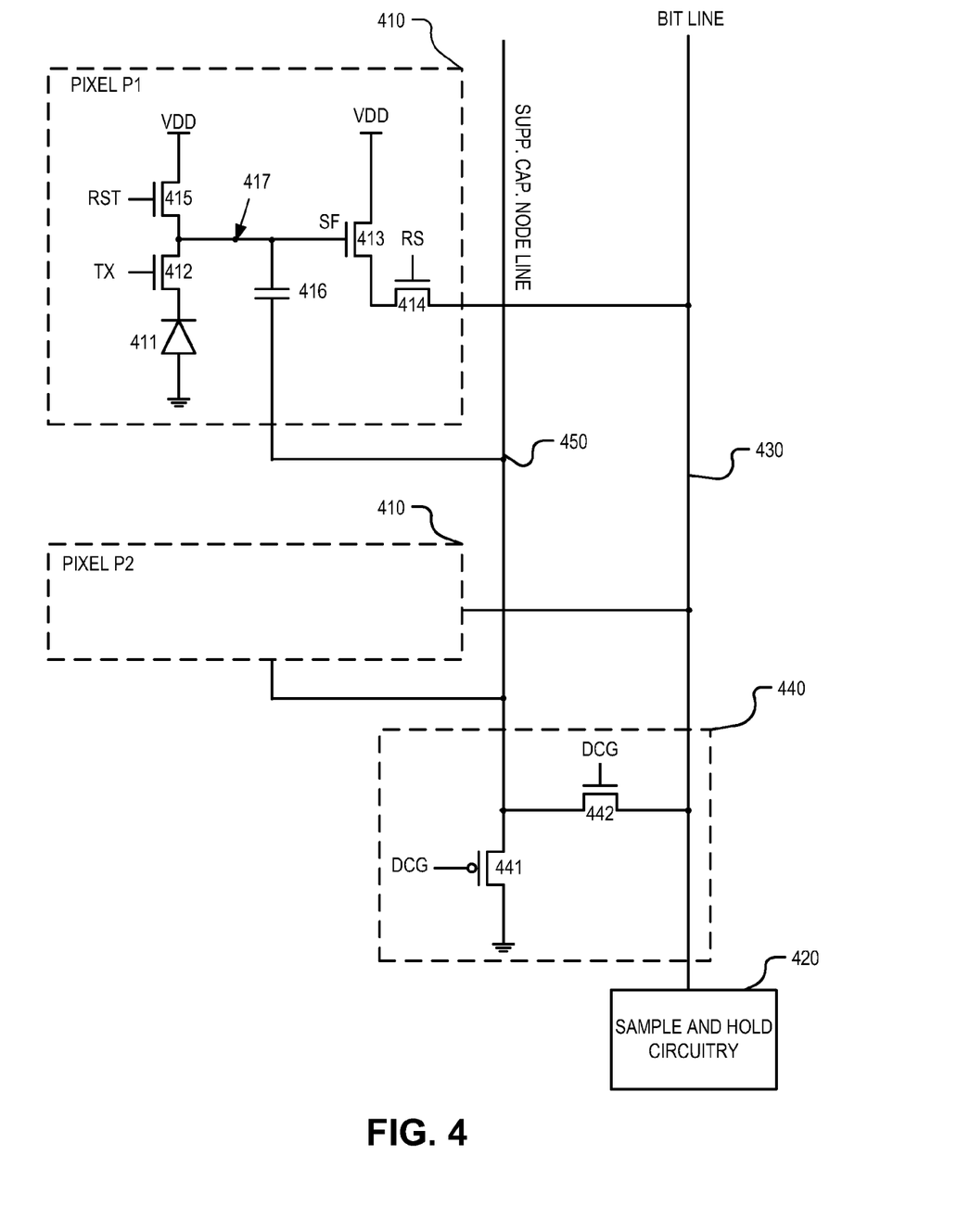
FIG. 4 is a circuit diagram illustrating two pixel cells with dual conversion gain within an image sensor array, in accordance to an embodiment of the invention.

FIG. 4 is a circuit diagram illustrating a portion of an image sensor 400 that includes a dual conversion gain feature, in accordance to an embodiment of the invention. The illustrated portion of image sensor 400 includes two pixel cells 410 within a given column, sample and hold circuit 420, a bit line 430, a dual conversion gain circuit 440, and a supplemental capacitance node line 450. Each pixel cell 410 represents one possible implementation of pixel cells P1-PN illustrated in FIG. 2.

In the illustrated embodiment, each pixel cell 410 includes a photodiode 411, a transfer transistor 412, a SF transistor 413, a RS transistor 414, a reset transistor 415, a supplemental capacitor 416, and a FD node 417. Row select transistor 414 is coupled between SF transistor 413 and a first output of pixel cell 410. The first output of pixel cell 410 is coupled to sample and hold circuit 420 via bit line 430. Supplemental capacitor 416 may represent an additional physical capacitor coupled to the FD node 417 or may simply represent the inherent capacitance associated with the FD node 417. Although FIG. 4 illustrates a 4T pixel architecture, it should be appreciated that embodiments of the present invention are not limited to 4T pixel architectures, but are also applicable to various other pixel architectures.

Supplemental capacitor 416 may be fabricated as a metal plate capacitor, a transistor capacitor, or otherwise. A first terminal of supplemental capacitor 416 is coupled to FD node 417, a second terminal of supplemental capacitor 416, which is also the second output of pixel cell 410, is coupled to supplemental capacitance node line 450. The second terminal of supplemental capacitor 416, in each pixel cell 410 in a column is coupled to the same supplemental capacitance node line 450. Supplemental capacitance node line 450 is coupled to dual conversion gain circuit 440. In the illustrated embodiment, dual conversion gain circuit 440 includes a transistor 441 (e.g., PMOS transistor), which is coupled between supplemental capacitance node line 450 and a reference voltage rail (e.g., ground) and under the control of signal DCG. In the illustrated embodiment, control signal DCG also controls a transistor 442 (e.g., NMOS transistor), which couples supplemental capacitance node line 450 to bit line 430.

Supplemental capacitor 416 has a capacitance of $C_{DCG}$. When supplemental capacitance node line 450 is coupled to ground, the contribution of supplemental capacitor 416 to floating diffusion node 417 is $C_{DCG}$. When supplemental capacitance node line 450 is coupled to bit line 430 via transistor 442, the contribution of supplemental capacitor 416 to floating diffusion node 417 is $C_{DCG}(1-A)$, where A is the gain of source follower transistor 413. For a typical source follower gain of 0.9, the feedback capacitance is $0.1C_{DCG}$. For example, if the capacitance at floating diffusion node 417 excluding supplemental capacitor 416 is 1 fF and supplemental capacitor 416 has a capacitance of 0.5 fF, when supplemental capacitance node line 450 is coupled to ground the total capacitance at the FD node is 1.5 fF because the capacitances add. When supplemental capacitance node line 450 is coupled to bit line 430, the total capacitance at the FD node 417 is 1.05 fF, since supplemental capacitor 416 contributes capacitance to the FD node according to $C_{DCG}(1-A)$.

Figure 5:
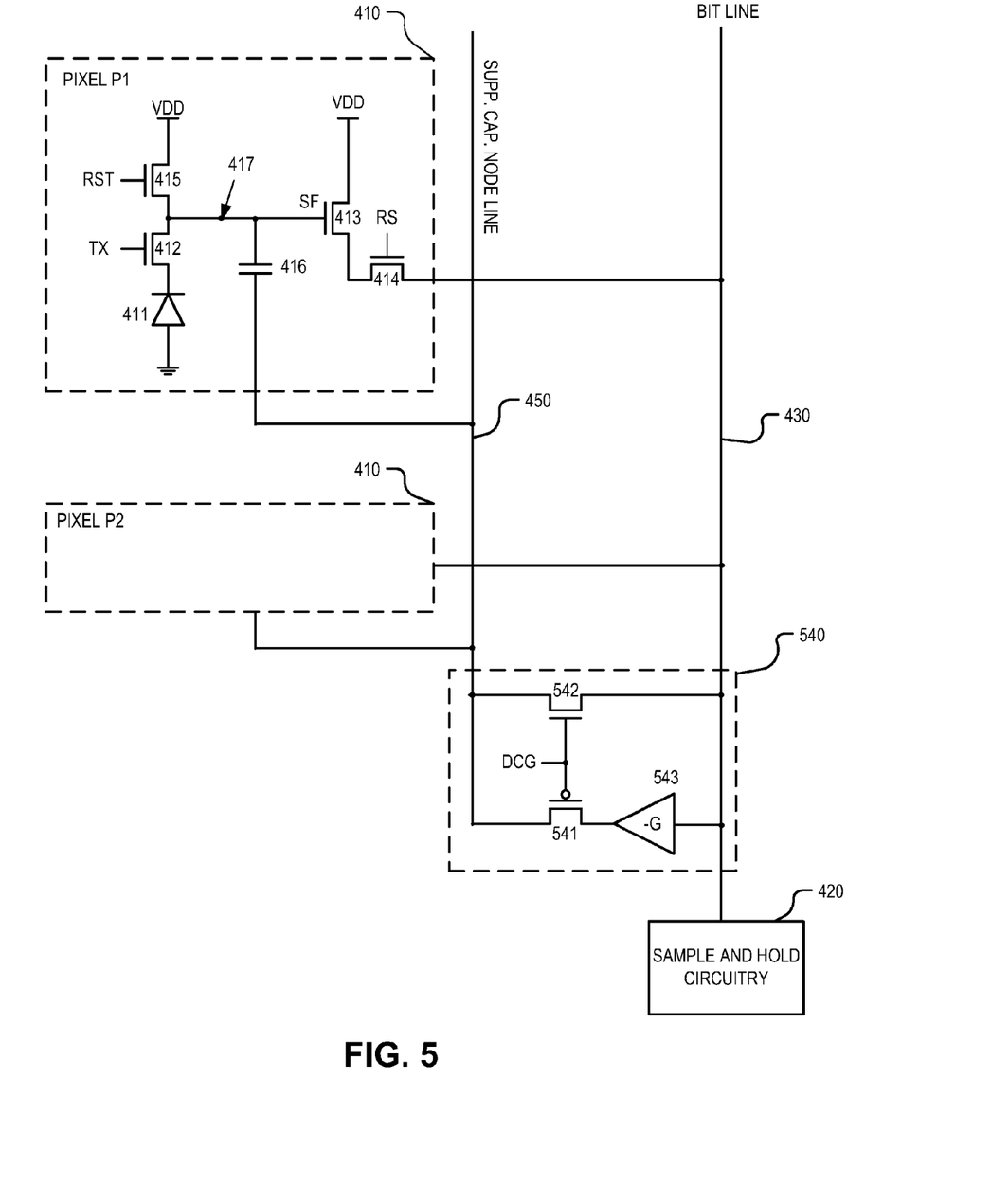
FIG. 5 is a circuit diagram illustrating two pixel cells with dual conversion gain within an image sensor array, in accordance to an embodiment of the invention.

FIG. 5 is a circuit diagram illustrating a portion of an image sensor 500 that includes a dual conversion gain feature, in accordance to an embodiment of the invention. The illustrated portion of image sensor 500 is similar to image sensor 400, except for modifications to dual conversion gain circuit 540. The illustrated embodiment of dual conversion gain circuit 540 includes a transistor 542 (e.g., NMOS transistor) having a channel coupled between supplemental capacitance node line 450 and bit line 430, a transistor 541 (e.g., PMOS transistor) having a channel coupled between supplemental capacitance node line 450 and the output of dual conversion gain amplifier 543. The input of dual conversion gain amplifier 543 is coupled to bit line 430.

In this embodiment, when supplemental capacitance node line 450 is coupled to bit line 430 via transistor 542, the contribution of supplemental capacitor 416 to floating diffusion node 417 is $C_{DCG}(1-A)$, where A is the gain of SF transistor 413. When supplemental capacitance node line 450 is coupled to bit line 430 via transistor 541 and dual conversion gain amplifier 543, the feedback capacitance is $C_{DCG}(1-G)$, where G is the gain of dual conversion gain amplifier 543. If the gain of dual conversion gain amplifier 543 is -G, the feedback capacitance would be $C_{DCG}(1+G)$. A higher feedback capacitance can be obtained without increasing the physical dimension of supplemental capacitor 416.

Various combinations/repetitions of DCG circuits 440 and 540 may also be implemented, resulting in multiple conversion gains. As such, reference to "dual" conversion gain or DCG throughout this specification may be generically referred to as multi conversion gain ("MCG") to refer to two or more conversion gain embodiments. Thus, the term MCG circuit may be used to refer to a conversion gain circuit that is capable of implementing two or more conversion gains.

Embodiments of the invention are applicable to both front side illuminated and backside illuminated image sensors, although fewer restrictions in backside illuminated image sensors makes the invention easier to implement. Embodiments of the invention are applicable to pixel circuitry in which multiple photodiodes and transfer transistors share a floating diffusion node. In these cases of shared pixels, the multi conversion gain feature may be useful since it is difficult to design a fully symmetrical floating diffusion coupling capacitance.

Although FIGS. 4 and 5 illustrate a single supplemental capacitance node line 450 and a single bit line 430 coupled to and shared by pixels within a given column of pixel array 205, it should be appreciated that other configurations are possible. Rather, supplemental capacitance node line 450 and bit line 430 may link to and be shared by any group or pattern of pixels within pixel array 205; however, supplemental capacitance node line 450 and bit line 430 will typically couple to the same group or pattern of pixels. For example, supplemental capacitance node line 450 and bit line 430 may couple to a column of pixels (column readout), a row of pixels (row readout), any arbitrary line of pixels, or a custom pattern of pixels (e.g., a grid pattern) within pixel array 205.

Figure 6A:
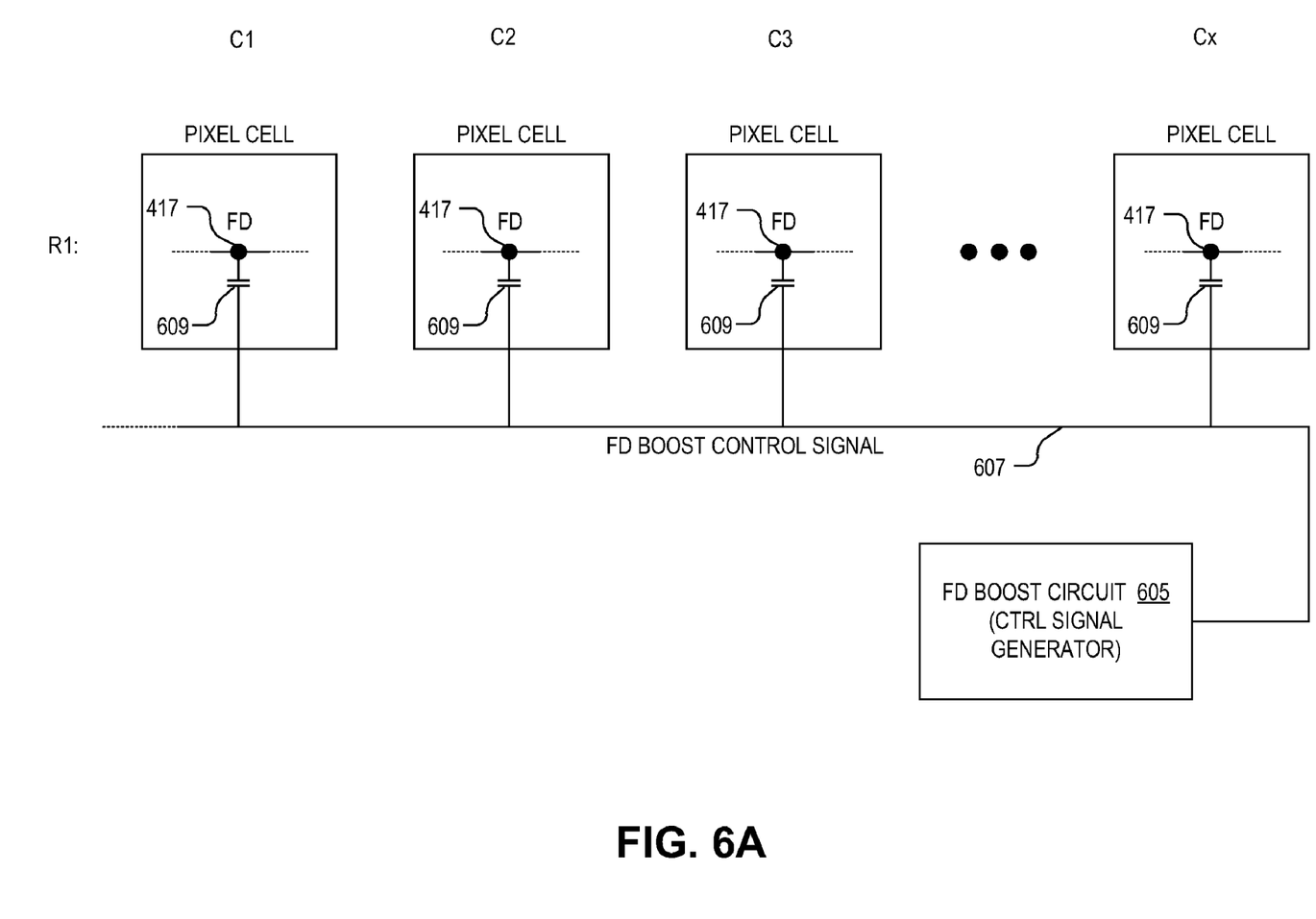
FIG. 6A is a functional block diagram illustrating an FD boost circuit coupled to a row of pixel cells for increasing full well capacity and reducing image lag, in accordance with an embodiment of the invention.

In general, embodiments of the invention contemplate the selective coupling of a supplemental capacitance to FD node 417 for a variety of applications. As discussed above, the supplemental capacitance can be added to FD node 417 to implement a multi conversion gain feature. However, a supplemental capacitance can also be selectively coupled to FD node 417 with specific timing during operation of pixel array 205 to provide a FD capacitive boost that increases the full well capacity of a pixel while also reducing image lag. FIG. 6A is a functional block diagram illustrating an example architecture for selectively boosting the potential of FD node 417 capacitively with a supplemental capacitance on a row-wise basis, in accordance with an embodiment of the invention. As discussed below in connection with the timing diagrams of FIGS. 8A and 8B, the potential boost can be added capacitively to FD node 417 via appropriate assertion of an FD boost control signal on supplemental capacitance node line 607 at select times during an imaging cycle.

Figure 6B:
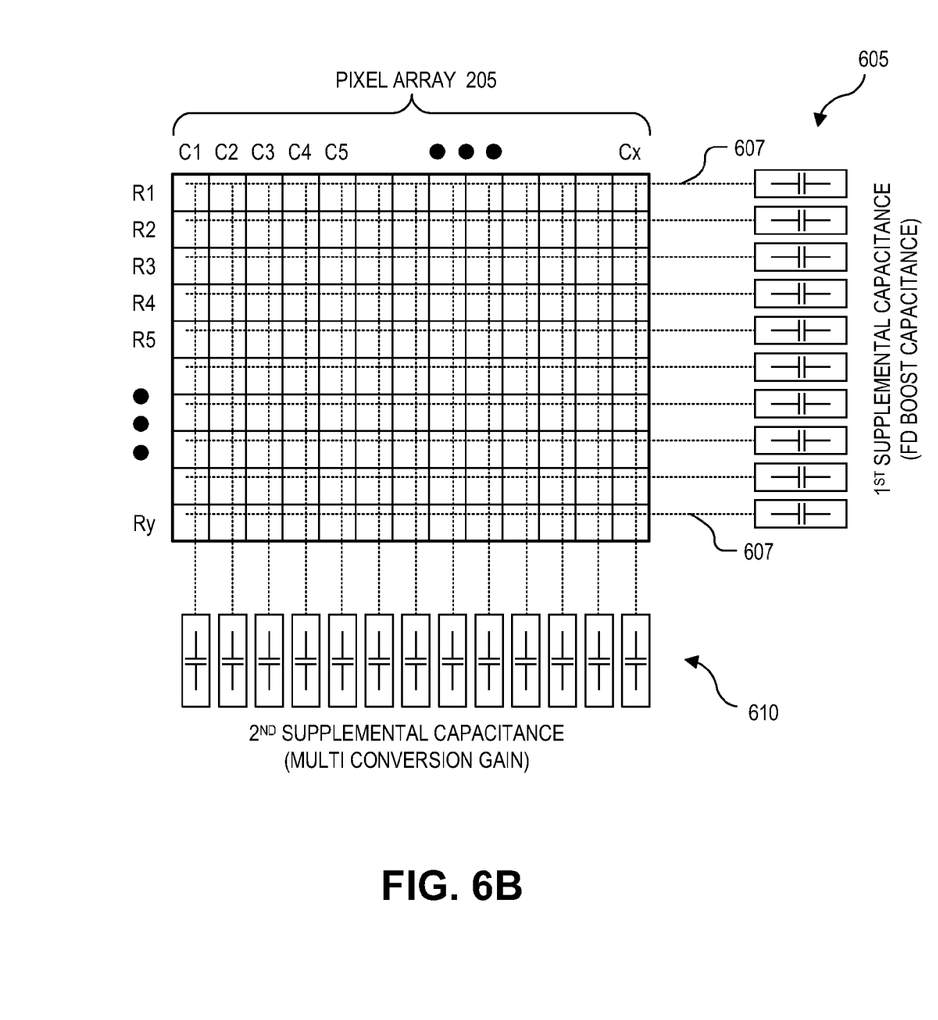
FIG. 6B illustrates row-wise coupling of an FD boost supplemental capacitance and column-wise coupling of a multi conversion gain supplemental capacitance, in accordance with an embodiment of the invention.

FIG. 6B is a functional block diagram illustrating how both a multi conversion gain feature and an FD boost feature can be added in combination to pixel array 205, in accordance with an embodiment of the invention. In the illustrated embodiment, a first supplemental capacitance (also referred to herein as an FD boost capacitance) may be added and shared row-by-row using FD boost circuits 605, while a second supplemental capacitance may also be added and shared column-by-column using MCG circuits 610. The first supplemental capacitance is added to address full well capacity and image lag (discussed in greater detail below), while the second supplemental capacitance is added to provide a multi conversion gain feature. These two supplemental capacitances can be added independently or in combination.

While FIG. 6B illustrates the FD boost capacitance being added on a row-by-row basis and the multi conversion gain capacitance being added on a column-by-column basis, as discussed above, these two supplemental capacitances can be added in other configurations depending upon the readout configuration of pixel array 205. For example, the FD boost capacitance can be coupled row-wise (illustrated in FIGS. 6A & 6B), column-wise, or a combination of both.

In one embodiment, FD boost circuits 605 each couple to a supplemental capacitance node line 607 that links to a first terminal of a supplemental capacitor 609 within each pixel of a given row while the second terminal of supplemental capacitor 609 links to FD node 417 of each pixel in the row (similar to capacitors 416 and supplemental capacitance node line 450, but row-wise). FD boost circuits 605 may be implemented using a variety of signal generation circuits that include logic capable of generating control pulses as disclosed in FIG. 8A or 8B. In one embodiment, FD boost circuits 605 are sub-elements of control circuit 220.

Figure 6C:
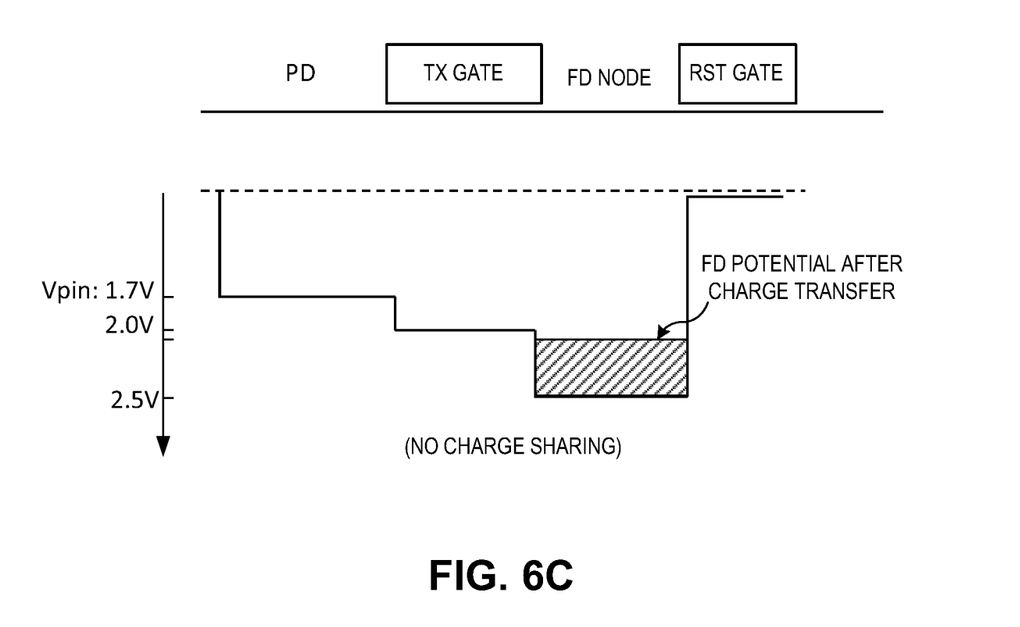
FIG. 6C illustrates charge transfer from a photodiode to a floating diffusion node that does not result in charge sharing, in accordance with an embodiment of the invention.
Figure 6D:
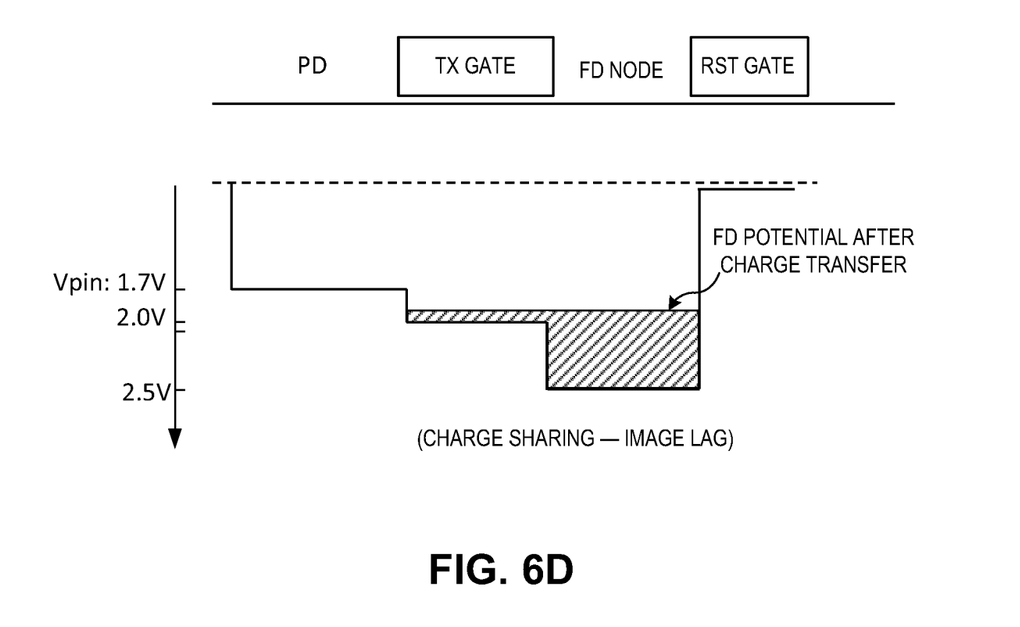
FIG. 6D illustrates charge transfer from a photodiode to a floating diffusion node that result in charge sharing, which causes image lag.

As the pixel-size of CMOS image sensors become smaller for higher pixel density and lower cost, the active area of the photodiode PD also becomes smaller. For pinned photodiodes that are commonly used for CMOS image sensors, the smaller photodiode area means that the pinning voltage (Vpin) of the photodiode (potential of photodiode PD when it is completely empty) needs to be higher in order to maintain reasonable full-well-capacity (the maximum number of charges that can be held in the photodiode PD). This in turn requires that the potential of the floating drain node during charge transfer be higher to avoid image lag. As shown in FIG. 6C, the FD node potential is decreased during charge transfer. The target full well capacity of a pixel cell is defined so that at the end of charge transfer, the FD node potential is still higher than the potential under the transfer gate and the Vpin of the photodiode PD, enabling full charge transfer. However, for pixels with high full well capacity, the FD node potential may decrease to a level that is lower than the potential under transfer gate or even Vpin of the PD, leading to so called charge sharing lag (FIG. 6D). If the FD node potential is not reset to a sufficiently high level before the charge transfer, the full well capacity often has to be limited to avoid any charge sharing lag, which leads to lower dynamic range and signal-to-noise ratio. Therefore, techniques to increase the potential of the FD node during charge transfer can be desirable.

Figure 7:
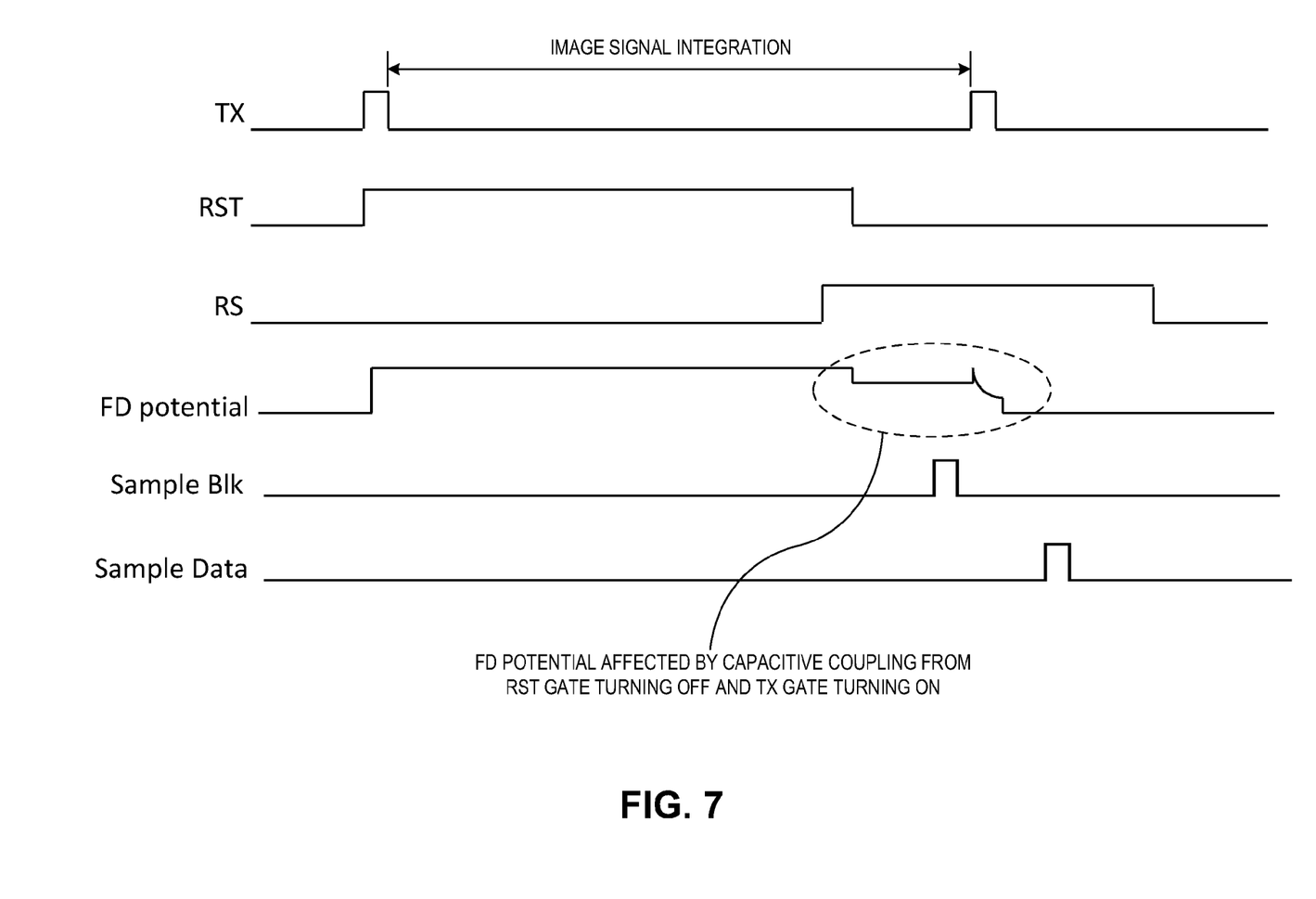

The FD node potential after reset is determined by the gate and drain voltage applied to the reset transistor (e.g., T2 in FIG. 3). In addition, the falling edge of the reset gate pulse (signal RST) causes a drop in FD node potential due to FD node to reset gate capacitive coupling. Likewise, the rising edge of the transfer gate (e.g., T1 in FIG. 3) also causes an increase in FD node potential due to capacitive coupling. These capacitive coupling effects during operation of a conventional image sensor without an FD boost circuit are illustrated in FIG. 7.

Pixel design is typically managed to reduce the FD node to reset gate coupling, while permitting reasonable FD node to transfer gate coupling, as the latter is favorable for better charge transfer. However, for shared pixels, the multiple transfer gates are turned on only one at a time which contributes to the favorable voltage coupling, while all transfer gate coupling capacitances contribute to the total FD node capacitance, leading to reduction of the conversion gain. This means that the FD node to transfer gate coupling cannot be increased too much to fully utilize the benefit of the positive capacitive coupling. Another difficulty is that the FD node coupling capacitance to the multiple transfer gates cannot typically be designed fully symmetrical, so the benefit is limited to the smallest coupling capacitance.

Figure 8A:
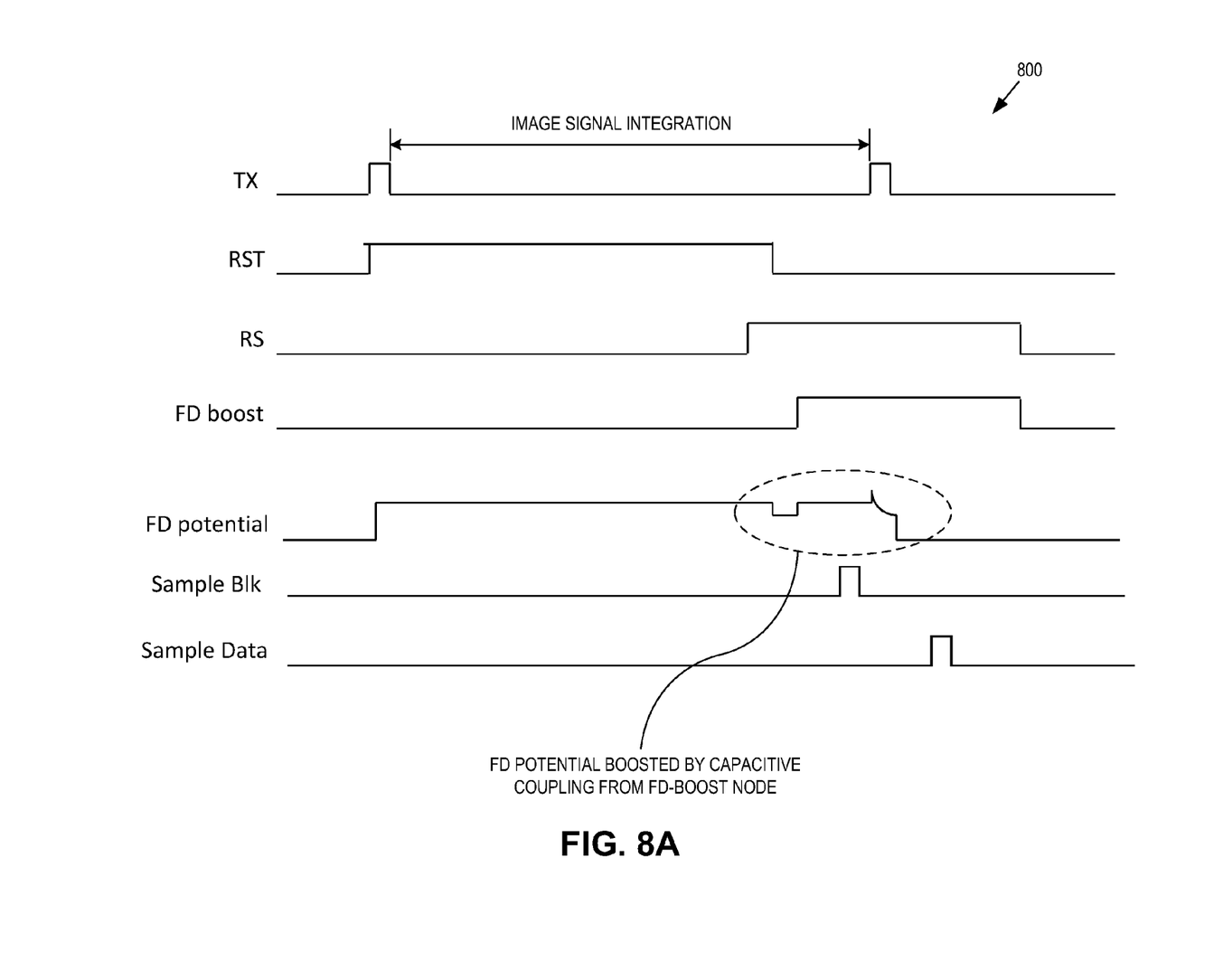
FIG. 8A is a timing diagram of control signals during operation of a pixel cell including an FD boost circuit, in accordance with an embodiment of the invention.
Figure 8B:
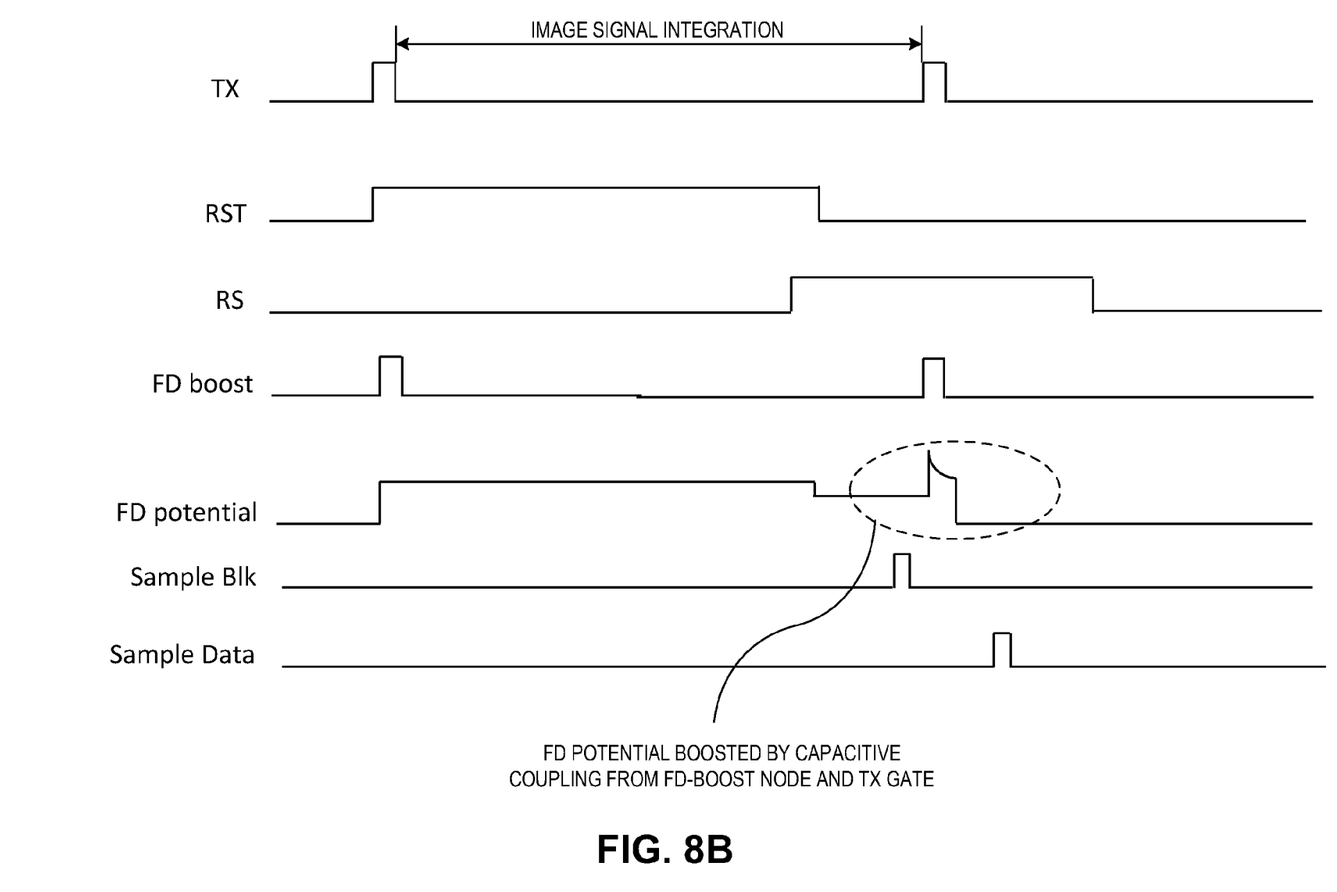
FIG. 8B is a timing diagram of control signals during an alternative operation mode of a pixel cell including an FD boost circuit, in accordance with an embodiment of the invention.

FIG. 8A illustrates a timing diagram 800 of control signals for controlling a pixel cell, in accordance with an embodiment of the invention. Timing diagram 800 includes a FD boost signal that increases the potential of the FD node when asserted. In the illustrated embodiment, the FD boost signal is switched from low to high after de-asserting the reset signal RST used to reset the FD node and before performing the correlated double sampling of the black level value (Sample Blk) and the image data (Sample Data) for the given pixel. In this embodiment, the FD boost signal remains asserted for the duration of sampling both the black level value and the image data. Alternatively, the FD boost signal can be also be asserted after sampling the black level value and before sampling the image data, as illustrated in FIG. 8B. In this embodiment, the FD boost signal need only be asserted during assertion of the TX signal applied to the gate of the transfer transistor.

The sampling capacitors for sampling the black level value and the image data may be located within sample and hold circuitry 420 and are used to sample the output image data on bit line 430 using correlated double sampling and hold the data while analog-to-digital conversion is executed. For example, the Sample Data signal may control the gate of a sampling transistor coupled in series between bit line 430 and a data sampling capacitor, while the Sample Blk signal may control the gate of another sampling transistor coupled in series between bit line 430 and a black level sampling capacitor.

One example design of the FD boost capacitance is selected to be about 10% of the total FD node capacitance. With this example design the conversion gain of the pixel is reduced by about 10%. If the FD boost node is switched from 0V to 3.3V, the FD node potential is boosted by 0.33V. For a typical FD signal swing of about 1V, the boosting is approximately equivalent to a 30% increase in allowable full well capacity.

One advantage of a selectable FD boost capacitance is increased freedom in pixel cell design. The FD boost capacitance can be positioned close to the source follower gate and therefore more symmetric to the multiple pixels with a shared pixel group. The benefit is in addition to the FD node to transfer gate coupling.

The above description of illustrated embodiments of the invention, including what is described in the abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor, comprising:
   a pixel array including a plurality of pixel cells each including:
      a floating diffusion ("FD") node; and
      a photosensitive element coupled to selectively transfer image charge to the FD node;
   a bit line coupled to selectively conduct image data output from a first group of the pixel cells;
   a supplemental capacitance node line coupled to the FD node of a second group of the pixel cells; and
   a supplemental capacitance circuit coupled to the supplemental capacitance node line to selectively add a supplemental capacitance to the FD node of each of the pixel cells of the second group in response to a control signal.

2. The image sensor of claim 1, wherein each of the pixel cells further comprises:
a capacitor having a first terminal coupled to the FD node and a second terminal coupled to the supplemental capacitance node line such that the capacitor is coupled in series between the FD node and the supplemental capacitance node line.

3. The image sensor of claim 1, wherein the supplemental capacitance circuit comprises a multi-conversion gain ("MCG") circuit, the MCG circuit comprising:
a first transistor having a channel coupled between the bit line and the supplemental capacitance node line, the first transistor having a control terminal coupled to be responsive to the control signal; and
a second transistor having a channel coupled to the supplemental capacitance node line, the second transistor having a control terminal coupled to be responsive to the control signal.

4. The image sensor of claim 3, wherein the channel of the second transistor is coupled between the supplemental capacitance node line and a reference voltage rail.

5. The image sensor of claim 4, wherein the first transistor comprises an NMOS transistor having a gate coupled to receive the control signal and the second transistor comprises a PMOS transistor also having a gate coupled to receive the control signal such that when the supplemental capacitance node line is coupled to the bit line through the first transistor the supplemental capacitance node line is decoupled from the reference voltage rail by the second transistor.

6. The image sensor of claim 3, wherein the MCG circuit further comprises:
an amplifier having an input coupled to the bit line and an output coupled to the channel of the second transistor such that the channel of the second transistor is coupled between the output of the amplifier and the bit line.

7. The image sensor of claim 6, wherein the amplifier comprises a negative gain amplifier.

8. The image sensor of claim 1, further comprising:
sample and hold circuitry coupled to the bit line to sample and hold the image data output from each of the pixel cells of the first group.

9. The image sensor of claim 8, wherein the control signal comprises an FD boost signal and wherein the supplemental capacitance circuit comprises a control circuit including logic to increase the potential at the FD node by asserting the FD boost signal after de-asserting a reset signal for resetting the FD node to a reset potential and before sampling the bit line with the sample and hold circuitry.

10. The image sensor of claim 9, wherein the first group of the pixel cells are organized into a column of the pixel array and the second group of the pixel array are organized into a row of the pixel array.

11. The image sensor of claim 8, wherein the control signal comprises an FD boost signal and wherein the supplemental capacitance circuit comprises a control circuit including logic to increase the potential at the FD node by asserting the FD boost signal after sampling a black reference value from the bit line and before sampling the image data from the bit line with the sample and hold circuitry.

12. The image sensor of claim 1, wherein the first and second groups represent the same group of pixel cells which are organized into a line within the pixel array.

13. The image sensor of claim 1, wherein the pixel array comprises a complementary metal-oxide semiconductor ("CMOS") pixel array, wherein each of the pixel cells further includes:
a transfer transistor coupled between the photosensitive element and the FD node for selectively transferring the image charge between the photosensitive element and the FD node; and
source follower transistor having a gate coupled to be responsive to the image charge transferred to the FD node and coupled to generate the image data for output to the bit line in response to the image charge transferred to the FD node.

14. The image sensor of claim 13, wherein each of the pixel cells further includes:
a reset transistor having a channel coupled between a reference voltage rail and the FD node; and
a select transistor having a channel coupled between the bit line and the source follower transistor.

15. A method of operating an image sensor, the method comprising:
determining an brightness value for light impingent upon a pixel array including a plurality of pixel cells for capturing an image;
adjusting a conversion gain of a first pixel cell of the pixel cells based upon the brightness value by adjusting a capacitance coupled to a floating diffusion ("FD") node within the first pixel cell;
capturing an image charge with a photosensitive element within the first pixel cell;
transferring the image charge to the FD node; and
outputting image data on a bit line coupled to the plurality of pixel cells, the image data based upon the image charge transferred to the FD node.

16. The method of claim 15, wherein adjusting the conversion gain of the first pixel cell based upon the brightness value comprises:
decoupling a supplemental capacitance from the FD node in low light conditions; or
coupling the supplemental capacitance to the FD node in high light conditions.

17. The method of claim 15, further comprising asserting an boost signal to a FD boost capacitance coupled to the FD node of the first pixel cell by:
for each sampling cycle of the first pixel cell, asserting the boost signal after resetting the FD node and before sampling the image data on the bit line with a sample and hold capacitor coupled to the bit line.

18. The method of claim 17, wherein the boost signal is asserted prior to sampling a black level value and the image data from the bit line.

19. The method of claim 15, wherein adjusting the capacitance coupled to the FD node within the first pixel cell comprises:
asserting or de-asserting a control signal for controlling a conversion gain ("CG") circuit coupled to the bit line of the plurality of pixel cells; and
adjusting the capacitance through a supplemental capacitance node line extending from the CG circuit and coupled to the FD node of each of the plurality of pixel cells.

20. The method of claim 19, wherein the CG circuit comprises:
a first transistor having a channel coupled in series between the bit line and the supplemental capacitance node line; and
a second transistor having a channel coupled in series between a reference voltage rail and the supplemental capacitance node line,
wherein the first and second transistors are responsive to the control signal.

21. The method of claim 19, wherein the CG circuit comprises:
  a first transistor having a channel coupled in series between the bit line and the supplemental capacitance node line; and
  an amplifier having an input coupled to the bit line; and
  a second transistor having a channel coupled in series the supplemental capacitance node line and an output of the amplifier,
  wherein the first and second transistors are responsive to the control signal.

22. A complementary metal-oxide semiconductor ("CMOS") image sensor, comprising:
  a pixel array including a plurality of pixel cells organized into a line within the pixel array, wherein each of the pixel cells includes:
    a floating diffusion ("FD") node; and
    a photosensitive element coupled to selectively transfer image charge to the FD node;
  a bit line coupled to selectively conduct image data output from each pixel cell organized into the line of the pixel array;
  a supplemental capacitance node line coupled to the FD node of each pixel cell organized into the line of the pixel array;
  a supplemental capacitance circuit coupled to the supplemental capacitance node line to selectively couple a supplemental capacitance to the FD node of each pixel cell organized into the line of the pixel array in response to a control signal; and
  a control circuit coupled to the supplemental capacitance circuit to selectively assert the control signal.

23. The CMOS image sensor of claim 22, wherein supplemental capacitance control circuit comprises a dual conversion gain ("DCG") circuit, the DCG circuit comprising:
  a first transistor having a channel coupled between the bit line and the supplemental capacitance node line, the first transistor having a control terminal coupled to be responsive to the control signal; and
  a second transistor having a channel coupled to the supplemental capacitance node line and a reference voltage rail, the second transistor having a control terminal coupled to be responsive to the control signal.

24. The CMOS image sensor of claim 22, wherein supplemental capacitance control circuit comprises a dual conversion gain ("DCG") circuit, the DCG circuit comprising:
  a first transistor having a channel coupled between the bit line and the supplemental capacitance node line, the first transistor having a control terminal coupled to be responsive to the control signal;
  a second transistor having a channel coupled to the supplemental capacitance node line; and
  an amplifier having an input coupled to the bit line and an output coupled to the channel of the second transistor such that the channel of the second transistor is coupled between the output of the amplifier and the bit line.

* * * * *